US010808167B2

(12) United States Patent
Beuterbaugh et al.

(10) Patent No.: US 10,808,167 B2
(45) Date of Patent: *Oct. 20, 2020

(54) METHODS FOR DISPERSING PROPPANT (71) Applicant: Halliburton Energy Services, Inc., Houston, TX (US)

(72) Inventors: Aaron M. Beuterbaugh, Spring, TX (US); Enrique Antonio Reyes, Tomball, TX (US)

(73) Assignee: HALLIBURTON ENERGY SERVICES, Houston, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 16/311,137

(22) PCT Filed: Jul. 27, 2016

(86) PCT No.: PCT/US2016/044257
§ 371 (c)(1),
(2) Date: Dec. 18, 2018

(87) PCT Pub. No.: WO2018/022040
PCT Pub. Date: Feb. 1, 2018

(65) Prior Publication Data
US 2019/0322923 A1    Oct. 24, 2019

(51) Int. Cl.
| | |
|---|---|
| C09K 8/80 | (2006.01) |
| C09K 8/88 | (2006.01) |
| C09K 8/94 | (2006.01) |
| E21B 43/26 | (2006.01) |
| C08L 67/02 | (2006.01) |
| C08L 67/04 | (2006.01) |

(52) U.S. Cl.
CPC .............. *C09K 8/80* (2013.01); *C09K 8/88* (2013.01); *C09K 8/94* (2013.01); *E21B 43/26* (2013.01); *C08L 67/02* (2013.01); *C08L 67/04* (2013.01)

(58) Field of Classification Search
CPC ............................ E21B 43/267; C09K 8/80
See application file for complete search history.

(56) References Cited

U.S. PATENT DOCUMENTS

| | | | |
|---|---|---|---|
| 7,021,379 B2 | 4/2006 | Nguyen | |
| 7,036,587 B2 | 5/2006 | Munoz, Jr. et al. | |

(Continued)

FOREIGN PATENT DOCUMENTS

| | | | | |
|---|---|---|---|---|
| WO | WO-2015060813 A1 * | 4/2015 | ............... | C09K 8/12 |
| WO | 2016010539 A1 | 1/2016 | | |

OTHER PUBLICATIONS

Patent Cooperation Treaty, International Search Report and Written Opinion, PCT Appln. No. PCT/US2016/044257, dated Apr. 19, 2017.

(Continued)

*Primary Examiner* — Angela M DiTrani Leff
(74) *Attorney, Agent, or Firm* — McGuireWoods, LLP (57) ABSTRACT

Methods for propping a fracture. The method comprises providing a treatment fluid comprising a polyester, a water-miscible solvent, and a proppant and then pumping the treatment fluid through an aqueous fluid within a wellbore to form an amorphous polymeric web. The method further comprises pumping the amorphous polymeric web into a fracture within a subterranean formation and then allowing the amorphous polymeric web to dissolve.

20 Claims, 4 Drawing Sheets

(56) References Cited

U.S. PATENT DOCUMENTS

| | | | |
|---|---|---|---|
| 8,016,040 | B2 | 9/2011 | Ali et al. |
| 8,697,612 | B2 | 4/2014 | Todd et al. |
| 8,985,213 | B2 | 3/2015 | Saini et al. |
| 10,633,580 | B2 * | 4/2020 | Beuterbaugh ............ C09K 8/68 |
| 2005/0167105 | A1 | 8/2005 | Roddy et al. |
| 2006/0283591 | A1 | 12/2006 | Willberg et al. |
| 2008/0070810 | A1 * | 3/2008 | Mang ..................... C04B 28/02 507/219 |
| 2009/0151944 | A1 | 6/2009 | Fuller et al. |
| 2012/0024529 | A1 | 2/2012 | van Zanten et al. |
| 2014/0048272 | A1 | 2/2014 | Tang |
| 2014/0076570 | A1 | 3/2014 | Nguyen |
| 2015/0060072 | A1 * | 3/2015 | Busby ..................... C09K 8/20 166/294 |
| 2016/0032175 | A1 | 2/2016 | Norman et al. |
| 2016/0160108 | A1 | 6/2016 | Reddy et al. |

OTHER PUBLICATIONS

Ahmed M. Gomaa, Andreas Nino-Penaloza, Dorianne Castillo, Elizabeth McCartney, and John Mayor, Baker Hughes, "Experimental Investigation of Paticulate Diverter Used to Enhance Fracture Complexity", Society of Petroleum Engineers, Feb. 2016, pp. 1-18, SPE-178983-MS.

Ahmed M. Gomaa, Harold Hudson, Scott Nelson, and Harold Brannon, Baker Hughes, "Improving Fracture Conductivity by Developing and Optimizing Channels within the Fracture Geometry: CFD Study", Society of Petroleum Engineers, Feb. 2016, pp. 1-25, SPE-178982-MS.

Leopoldo Sierra, Pinnacle, "Pressure-Dependent Induced Fracture Complexity or Natural Fracture Contribution Evaluation in Unconventional Reservoirs: How to Assure Their Long-Term Benefit", Society of Petroleum Engineers, Feb. 2016, pp. 1-29, SPE-178997-MS.

Ahmed M. Gomaa; Andrea Nino-Penaloza, Elizabeth McCartney, and John Mayor, Baker Hughes, "Engineering Solid Particulate Diverter to Control Fracture Complexity: Experimental Study", Society of Petroleum Engineers, Feb. 2016, pp. 1-19, SPE-179144-MS.

* cited by examiner

METHODS FOR DISPERSING PROPPANT

TECHNICAL FIELD

The present disclosure relates to the use of a polymer to disperse proppant into fractures within a subterranean formation and more particularly to the use of a solubilized polymer to suspend and agglomerate proppant and then to disperse the agglomerated proppant into a fracture in a subterranean formation.

BACKGROUND

Stimulation techniques may be used to increase the amount of hydrocarbons obtained from a subterranean formation. For example, some unconventional subterranean formations may be fractured to improve well productivity by placing or enhancing fractures which run from a wellbore into a surrounding subterranean formation. Proppant "props" open fractures formed in the subterranean formation and prevent the fracture from closing by maintaining a conductive path through the fracture. Proppant may also be used to prop open natural fractures in the subterranean formation. A successfully propped fracture exposes a larger amount of surface area of the subterranean formation to the wellbore, and this may enhance the recovery rate from the subterranean formation.

As proppant is placed in a fracture, the formation pressure compresses the fracture packing the proppant together to form a proppant pack within the fracture. The recovery rate from the fracture is a function of the fracture shape and dimensions and the permeability of the proppant pack. Dispersal of proppant in the fracture is performed by introducing an aqueous treatment fluid comprising the proppant into the fracture at a very high pressure. The proppant may be suspended in the aqueous fluid by the use of water soluble gelling agents which may be used to alter the fluid rheology. Dispersal of the proppant into the fracture may be a function of the particulate size of the proppant and the size of the fracture. Some of the proppant may also flow back into the wellbore when the formation pressure compresses the fracture and drives the treatment fluid and any proppant back out into the wellbore. The proppant which does settle into the fracture may then be compressed into the proppant pack.

Dispersal of proppant is an operation which has very little operator control. Generally, a variety of proppant sizes are pumped into the fracture with the goal that enough proppant will be present to prevent the fracture from closing. If too little proppant is placed in the fracture, the formation pressure will close the fracture. If this event occurs, said portion of the subterranean formation may need to be refraced which may be expensive and time consuming.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to the use of a polymer to disperse proppant into fractures within a subterranean formation and more particularly to the use of a solubilized polymer to suspend and agglomerate proppant and then to disperse the agglomerated proppant into a fracture in a subterranean formation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods described herein comprise the use of water-insoluble degradable polyesters in a treatment fluid comprising a proppant. The polyester is solubilized with a solvent and then precipitated by contact with an aqueous fluid prior to insertion into a fracture. The precipitated polyester forms an amorphous polymeric web or structure which may "capture" the proppant forming aggregates which may then be injected into the fracture. "Web," as used herein generally refers to any structure or shape sufficient for capturing and carrying proppant within. The size and shape of the "web" is factor of the density and location of the solubilized polyesters when precipitated. "Capture," as used herein, refers to the entrapment of the proppant by the polyester as it is driven out of solution. As this amorphous polymeric web flows into the fracture it fills the fracture and remains in the fracture while the fracture pressure is drawn down. The proppant aggregates captured by the amorphous polymeric web may remain in the fracture, and the risk of proppant flow back is reduced. Further, the amorphous polymeric web is able to entrap the proppant as it is driven out of solution ensuring that the captured proppant is injected into the fracture along with the amorphous polymeric web. Moreover, the amorphous polymeric web forms discretized proppant aggregates prior to injection into the fracture. As such, the proppant may already be formed into sizable aggregates prior to compression of the fracture by the formation pressure. The polyester used to produce the amorphous polymeric web degrades over time in the fracture. Because the amorphous polymeric web captures proppant as discrete aggregates prior to the formation of proppant packs by fracture compression, the proppant aggregates will already be present and randomly placed and randomly dispersed in the fracture. As such, formation pressure is less relied upon to pack the proppant successfully. This effect coupled with the ability of the amorphous polymeric web to capture the proppant and carry it into the fracture and to also reduce flow back of the proppant may allow for less proppant to be pumped. As such, there may be a reduction in operational expenditures. Further, the use of less proppant in the fracture allows for greater permeability of the proppant pack which may result in an increase in the rate of recovery from the fracture. Additionally, gaps may remain between the dispersed agglomerated proppant packs resulting in increased permeability relative to proppant dispersed in a fracture without an amorphous polymeric web.

Examples of the treatment fluids described herein comprise a water-insoluble degradable polyester. The polyester should be water-insoluble such that it remains solid in an aqueous fluid and does not dissolve. As such, exposure of the solubilized polyester to an aqueous fluid will drive the polyester out of solution. The polyester should be degradable such that it degrades over time. Degradation mechanisms may include, but should be limited to, hydrolysis, erosion, chemical degradation, biodegradation, and the like. Suitable degradable polyesters may include, but are not limited to, poly(lactide), poly(glycolide), poly(e-caprolactone), poly(hydroxybutyrate), poly(orthoester), any copolymer thereof, any derivative thereof, or any combination thereof. The polyesters may be aliphatic or aromatic. The polyesters are dissolved in a water-miscible solvent and then this solution is introduced to the aqueous fluid. The concentration of the polyester in the water-miscible solvent may be any concentration up to the saturation point of the specific chosen solvent. As such, concentration of the polyester is a function of the effectiveness of the polyester to precipitate and capture a desired amount of a specific chosen proppant and the amount of said polyester which may be dissolved in a specific chosen solvent.

Examples of the treatment fluids described herein comprise a water-miscible solvent. As used herein, the term "water-miscible solvent" refers to a non-aqueous fluid that mixes by diffusion in some proportion with water at ambient or formation temperatures without the use of chemical additives (for example, compatibilizing solvents such as mutual solvents such as alcohol ethers and the like). The water-miscible solvent should be sufficient for dissolving the polyester and not merely suspending particles or particulates of the polyester. Genera; examples of water-miscible solvents may include, but are not limited to, nitriles, ketones, aldehydes, formamides, alkanes, halogenated alkanes, halogenated carboxylic acids, halogenated alcohols, aromatics, amines, cyclic amines, pyridines, pyrrolidones, ethers, cyclic ethers, esters, cyclic esters, furans, halogenated derivatives thereof, or any mixture thereof. Specific examples of such water-miscible solvents may include, but are not limited to, acetonitrile, dimethylformamide, methyl ethyl ketone, tetrhydrofuran, pyridine, N-methyl-2-pyrrolidone, dimethyl sulfoxide, butyrolactone, hexafluroro-2-propanol, acetic acid, formic acid, ethyl acetate, acetone, glycol, glycerol, tetrahydrofuran, dioxane, dichloromethane, methanol, acetonitrile, diethyl ether, benzene, toluene, trifluoroacetic acid, hexafluoro-2-propanol, dichloromethane, chloroform, carbon tetrachloride, pentane, hexane, heptane, octane, halogenated derivatives thereof, alkylated derivatives thereof, isomers thereof, or any mixture thereof.

Examples of the treatment fluids described herein comprise proppant. In some examples, the proppant may be particulate and of various sizes. In some examples, multi-modal particle size distributions of the proppant may be used in the treatment fluids. In some examples, multiple species of proppant may be used in the treatment fluids. The proppant may be used to prop open fractures and form proppant packs within fractures. Suitable species of proppant include, but are not limited to, sand, natural sand, quartz sand, bauxite and other ore, ceramic materials, glass materials, particulate garnet, metal particulates, nylon pellets, polymer materials, polytetrafluoroethylene materials, nut shell pieces, seed shell pieces, fruit pit pieces, wood, or combinations thereof. Suitable proppant may also include composite particulates comprising a binder and a filler material wherein suitable filler materials include silica, alumina, fumed carbon, carbon black, graphite, mica, titanium dioxide, meta-silicate, calcium silicate, various clays and clay families (e.g., kaolin, illite, halloysite, nacrite, smectite, saponite, sepiolite montmorillonite, etc.), talc, zirconia, boron, slag, fly ash, hollow glass microspheres, solid glass, microparticulates, or combinations thereof. The concentration of the proppant in the treatment fluid may range from about 0.1% by weight of the treatment fluid to about 50% by weight of the treatment fluid. The concentration of the proppant in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the proppant in the treatment fluid may be about 0.1% by weight of the treatment fluid, about 1% by weight of the treatment fluid, about 5% by weight of the treatment fluid, about 10% by weight of the treatment fluid, about 30% by weight of the treatment fluid, about 40% by weight of the treatment fluid, or about 50% by weight of the treatment fluid. With the benefit of this disclosure, one of ordinary skill in the art will be able to select a proppant and prepare a treatment fluid comprising the proppant for a given application.

As discussed, the proppant may be variously sized. As used herein, the term "fine," when used to describe proppant, for example, fine proppant, refers to proppant particulates having an average particle size distribution in the range of from about 0.1 micrometers ($\mu$m) to about 100 $\mu$m, encompassing any value and subset therebetween, such as about 1 $\mu$m to about 20 $\mu$m, or about 20 $\mu$m to about 40 $\mu$m, or about 40 $\mu$m to about 60 $\mu$m, or about 60 $\mu$m to about 80 $\mu$m, or about 80 $\mu$m to about 100 $\mu$m, encompassing any value and subset therebetween. In some examples, the fine proppant has an average particle size distribution in the range of from a lower limit of about 0.1 $\mu$m, 1 $\mu$m, 5 $\mu$m, 10 $\mu$m, 15 $\mu$m, 20 µm, 25 µm, 30 µm, 35 µm, 40 µm, 45 µm, and 50 µm to a higher limit of about 100 µm, 95 µm, 90 µm, 85 µm, 80 µm, 75 µm, 70 µm, 65 µm, 60 µm, 55 µm, and 50 µm, encompassing any value and subset therebetween. As used herein, the term "medium," when used to describe proppant, for example, medium proppant, refers to proppant particulates having an average particle size distribution in the range of from about 100 µm to about 200 µm, encompassing any value and subset therebetween, such as about 100 µm to about 120 µm, or about 120 µm to about 140 µm, or about 140 µm to about 160 µm, or about 160 µm to about 180 µm, or about 180 µm to about 200 µm, encompassing any value and subset therebetween. In some examples, the medium proppant has an average particle size distribution in the range of from a lower limit of about 100 µm, 105 µm, 110 µm, 115 µm, 120 µm, 125 µm, 130 µm, 135 µm, 140 µm, 145 µm, and 150 µm to an upper limit of about 200 µm, 195 µm, 190 µm, 185 µm, 180 µm, 175 µm, 170 µm, 165 µm, 160 µm, 155 µm, and 150 µm, encompassing any value and subset therebetween. As used herein, the term "coarse," when used to describe proppant, for example, coarse proppant, refers to proppant particulates having an average particle size distribution greater than about 200 µm, including size ranges comprising several millimeters. In some examples, the coarse proppant has an average particle size distribution in the range of from a lower limit of about 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, 1 mm, 1.5 mm, 2 mm, 2.5 mm, 3 mm, 3.5 mm, 4 mm, 4.5 mm, 5 mm, and so on and also encompassing any value and subset therebetween. Each of these values is critical to the examples of the present disclosure and may depend on a number of factors including, but not limited to, the type of proppant selected, the type of subterranean formation being treated, the desired complex fracture geometry, and the like. While overlap in these size ranges may be possible, the selection of the sized proppant particulates may be dependent on a number of factors including, but not limited to, the material of the proppant, the shape of the proppant, the type of subterranean formation, the size of the dominate fracture, the presence of or desire to create a fracture network, and the like.

In the various examples, the treatment fluids comprising the solubilized polyester may contact an aqueous fluid used to drive the polyester out of solution. The aqueous fluid may generally be from any source including the subterranean formation. In various examples, the aqueous fluid may comprise fresh water, acidified water, salt water, seawater, brine, or an aqueous salt solution. In some embodiments, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. In examples, the aqueous fluid should contact the treatment fluid such that at least a portion of the solubilized polyester is driven out of solution prior to entering the fracture so that the precipitated polyester may form an amorphous polymeric web which may capture and carry the proppant into the fracture. For example, the treatment fluid comprising the solubilized polyester may be streamed through the aqueous fluid as the treatment fluid is injected into the fracture. As another example, the treatment fluid comprising the solubilized polyester may be mixed with proppant and then added to a vessel containing the aqueous fluid prior to pumping the treatment fluid into the subterranean formation.

The aqueous fluid may comprise an additive. For example, the aqueous fluid may comprise an acid, a scale inhibitor, a clay stabilizing agent, a shale stabilizing agent, a viscosifier, a permeability modifier, one or more salts, or any combination thereof. Examples of acids may include, but are not limited to, hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboric acid, fluorophosphoric acid, hexafluorotitanic acid, fluorophosphoric acid, phosphoric acid, or any combination thereof. Examples of scale inhibitors may include, but are not limited to, tetrasodium ethylenediamine acetate, pentamethylene phosphonate, hexamethylenediamine phosphonate, polyacrylate, or any combination thereof. Examples of shale stabilizing agents may include, but are not limited to, long chain alcohols, polyols, amine inhibitors, sodium or potassium silicates, partially hydrolyzed polyacrylamides, polyalkene glycols, anionic surfactants, salt solutions containing, for example, sodium chloride, potassium chloride, or ammonium chloride; cationic polymers and oligomers, for example, poly(dimethyldiallylammonium chloride), cationic poly(acrylamide), cationic poly(diemethylaminoethylmethacrylate), or any combination thereof. Examples of viscosifiers may include, but are not limited to, mineral viscosifiers (e.g., bentonite and the like), polymeric viscosifiers, crosslinked polymeric viscosifiers, crosslinkable polymeric viscosifiers, viscoelastic surfactants, or any combination thereof. Examples of permeability modifiers may include, but are not limited to, a hydrophobically modified hydrophilic polymer. Hydrophobically modified hydrophilic polymers vary widely in structure, but generally comprise a hydrophilic polymer that has been at least partially chemically modified with hydrophobic groups (e.g., long chain alkyl groups having more than four carbon atoms). Hydrophilic polymers may include homopolymer, copolymers, terpolymers, and the like with monomeric units that include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide, acrylamide, methacrylamide, and hydroxyethyl acrylate. In some instances, other monomeric units may be included in the copolymers and terpolymers.

As discussed above, the polyester may be driven out of solution when the treatment fluid contacts an aqueous fluid. The polyester may form an amorphous polymeric web. As the polymeric web is amorphous, it does not possess a clearly defined shaped. It may generally be described as being globular and forming ribbon-like strands. Examples of the amorphous polymeric web with captured proppant are illustrated by FIGS. 4-9 discussed below. The amorphous polymeric web may also be described as being non-particulate in nature as it may form one or more continuous structures instead of minute discrete particles of matter. As described above, the amorphous polymeric web is able to capture the proppant in the treatment fluid when the polyester is driven out of solution. The amorphous polymeric web may then carry the proppant into a fracture, which may reduce the amount of proppant lost to other areas not selected for stimulation (e.g., rat hole, annulus, etc.). Further, due to the nature of the amorphous polymeric web, the amorphous polymeric web may be less susceptible to flow back as compared to loose uncaptured proppant. As such, the amorphous polymeric web may remain in the fracture with the captured proppant, reducing the amount of proppant lost to flow back. As the amorphous polymeric web captures the proppant, the proppant is prevented from separating from the amorphous polymeric web and thus an individual captured proppant particulate is prevented from being dispersed and separated from other individual captured proppant particulates. As such, the amorphous polymeric web may maintain the proppant in an aggregated state, which may allow for more efficient proppant placement when the formation pressure compresses the proppant into the proppant pack. This arrangement of the proppant into aggregates prior to the formation pressure acting to produce the proppant packs may allow for less proppant to be used to prop the fracture which may result in an overall increase in proppant pack permeability and a corresponding increase in the recovery rate from the fracture.

In some examples, the treatment fluid may be foamed to increase the buoyancy of the amorphous polymeric web when formed. Foaming of the treatment fluid generally comprises adding a gas to the treatment fluid. When the solubilized polyester is contacted by an aqueous fluid and driven out of solution, the resulting amorphous polymeric web may capture pockets of the gas and trap it in the amorphous polymeric web. The captured gas may increase the buoyancy of the amorphous polymeric web which, in some examples, may increase the ability of the amorphous polymeric web to travel in and remain in a fracture.

In examples, the treatment fluid may be foamed at the surface or downhole. The treatment fluid may be foamed by entraining gas into the treatment fluid. In some examples, a foaming additive may also be added to the treatment fluid. Examples of gas sufficient for foaming include, but are not limited to, nitrogen, carbon dioxide, air, methane, helium, argon, or any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

The quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

The amorphous polymeric web may be degraded over time to leave the captured aggregated proppant within the fracture. For example, the amorphous polymeric web may be hydrolyzed over time. Alternatively, the amorphous polymeric web may break down at elevated temperatures. In some instances, the amorphous polymeric web may be at least partially chemically degraded. For example, the amorphous polymeric web may be contacted with an inorganic base, an amine, an amino alcohol, or similar chemical degradation agent once the amorphous polymeric web has carried and dispersed the captured aggregated proppant into the fracture.

Although the examples described herein refer to a "fracture," it is to be understood that the amorphous polymeric web may carry the proppant into multiple fractures, for example, multiple primary or multiple dominant fractures. Further, the amorphous polymeric web may carry the proppant into multiple fractures within a fracture network, for example, secondary fractures, tertiary fractures, and so on. Some examples described herein may further involve producing hydrocarbons from the fracture into which the amorphous polymeric web was placed.

In the examples, systems configured for delivering the treatment fluids and aqueous fluids described herein to a downhole location are described. The systems may comprise a pump coupled to a tubular. The pump may be a high pressure pump in some examples. As used herein, the term "high pressure pump" will refer to a pump that is capable of delivering a fluid downhole at a pressure of about 1000 psi or greater. Suitable high pressure pumps will be known to one having ordinary skill in the art and may include, but are not limited to, floating piston pumps and positive displacement pumps.

In other examples, the pump may be a low pressure pump. As used herein, the term "low pressure pump" will refer to a pump that operates at a pressure of about 1000 psi or less. In some examples, a low pressure pump may be coupled to a high pressure pump that is coupled to the tubular. That is, in such examples, the low pressure pump may be configured to convey the treatment fluid and/or the aqueous fluid to the high pressure pump. In such examples, the low pressure pump may "step up" the pressure of the treatment fluid and/or aqueous fluid before it reaches the high pressure pump.

In some examples, the systems described herein can further comprise a mixing tank that is upstream of the pump and in which the treatment fluid and/or aqueous fluid is formulated. In various examples, the pump (e.g., a low pressure pump, a high pressure pump, or a combination thereof) may convey the treatment fluid and/or aqueous fluid from the mixing tank or other vessel to the tubular. In other examples, however, the treatment fluid and/or aqueous fluid may be formulated offsite and transported to a worksite, in which case the treatment fluid and/or aqueous fluid may be introduced to the tubular via the pump directly from its shipping container (e.g., a truck, a railcar, a barge, or the like) or from a transport pipeline. In either case the treatment fluid and/or aqueous fluid may be drawn into the pump, elevated to an appropriate pressure, and then introduced into the tubular for delivery downhole.

Figure 1:
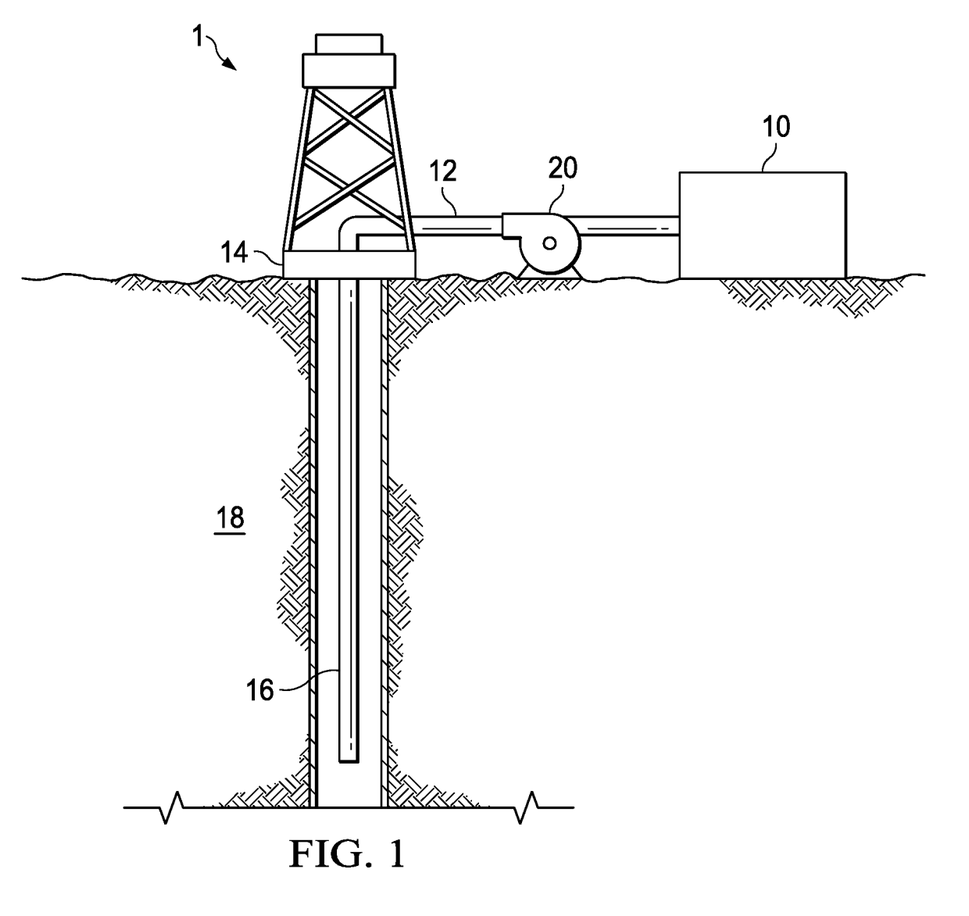
FIG. 1 illustrates a schematic of a system to deliver the treatment fluids and/or aqueous fluids to a downhole location.

FIG. 1 shows an illustrative schematic of a system to deliver the treatment fluids and/or aqueous fluids to a downhole location, according to one or more examples. It should be noted that while FIG. 1 generally depicts a land-based system, it is to be recognized that like systems may be operated in subsea locations as well. As depicted in FIG. 1, system 1 may include mixing tank 10, in which a treatment fluid and/or aqueous fluid may be formulated. In some examples, the treatment fluid may be formulated and then mixed with the aqueous fluid in mixing tank 10 to drive the solubilized polyester out of solution while in mixing tank 10. In alternative examples, the treatment fluid may not be mixed with any aqueous fluid while present in mixing tank 10. The treatment fluid and/or aqueous fluid may be conveyed via line 12 to wellhead 14, where the treatment fluid and/or aqueous fluid may enter tubular 16, tubular 16 may extend from wellhead 14 into subterranean formation 18. In some examples, upon being conveyed by tubular 16, the treatment fluid may be streamed through a layer of aqueous fluid placed in a downhole portion of tubular 16 and/or disposed in the wellbore annulus between tubular 16 and the subterranean formation 18. The treatment fluid may be streamed through the aqueous fluid to drive the solubilized polyester out of solution. The treatment fluid may be streamed through the aqueous fluid before the treatment fluid enters a fracture in subterranean formation 18. Pump 20 may be configured to raise the pressure of the treatment fluid and/or aqueous fluid to a desired degree before its introduction into tubular 16. It is to be recognized that system 1 is merely exemplary in nature, and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
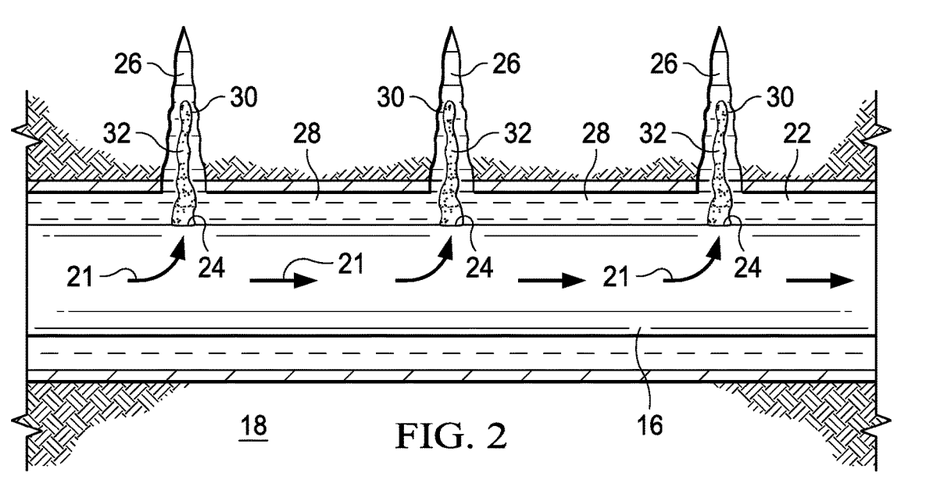
FIG. 2 illustrates a schematic of a system to inject the treatment fluids into a fracture within a subterranean formation.

FIG. 2 shows an illustrative schematic of a system to inject the treatment fluids into a fracture within a subterranean formation. In the example of FIG. 2, a treatment fluid comprising a solubilized polyester and proppant is disposed in tubular 16 and pumped in the directions indicated by arrows 21. The treatment fluid may be injected into annulus 22 through ports 24 within the wall of tubular 16 and which are adjacent fractures 26. Annulus 22 may be a wellbore annulus or an annulus between concentric tubulars 16. Within annulus 22 is disposed an aqueous fluid 28 as described herein. As the treatment fluid is injected through ports 24 into annulus 22, the solubilized polyester within the treatment fluid is driven out of solution to form an amorphous polymeric web 30 with captured proppant 32 disposed therein. The amorphous polymeric web 30 may then enter a fracture 26 with the captured proppant 32. As described above, the amorphous polymeric web 30 may degrade after a time, and the captured proppant 32 may prop fracture 26.

Figure 3:
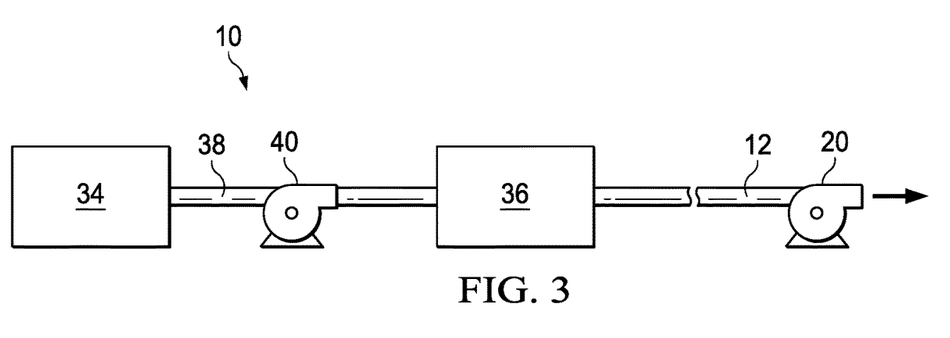
FIG. 3 illustrates a schematic of an example of a mixing tank used to form the amorphous polymeric web comprising the captured proppant at the surface.

FIG. 3 shows an illustrative schematic of an alternative example of the mixing tank 10 (as illustrated in FIG. 1) which forms the amorphous polymeric web comprising the captured proppant at the surface. In this particular example, mixing tank 10 may comprise multiple vessels. First vessel 34 may comprise the polyester, water-miscible solvent, and the proppant. The polyester, water-miscible solvent, and the proppant may be mixed in first vessel 34 to form the treatment fluid. When mixed sufficiently, the polyester will be dissolved in the water-miscible solvent and the proppant will be suspended in the treatment fluid to the desired degree. The treatment fluid may then be conveyed to a second vessel 36 by line 38 and low-pressure pump 40. Second vessel 36 may comprise an aqueous fluid. The low-pressure pump 40 may stream the treatment fluid into the second vessel 36 where it may contact the aqueous fluid and form an amorphous polymeric web which may capture the proppant. The amorphous polymeric web with the captured proppant may then be pumped via line 12 and pump 20 (as illustrated in FIG. 1) into the wellbore where the amorphous polymeric web may then enter a fracture and carry the proppant therein.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-3.

EXAMPLES

The present disclosure can be better understood by reference to the following examples which are offered by way of illustration. The present disclosure is not limited to the examples given herein.

Example 1

Figure 4:
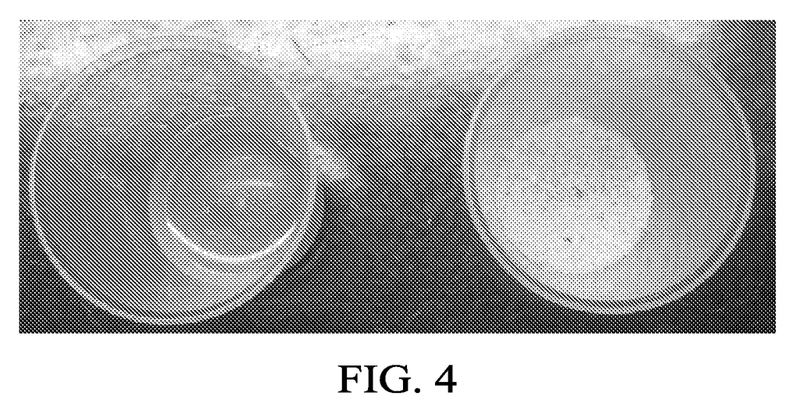
FIG. 4 is a photograph of a solubilized polyester and a proppant.
Figure 5:
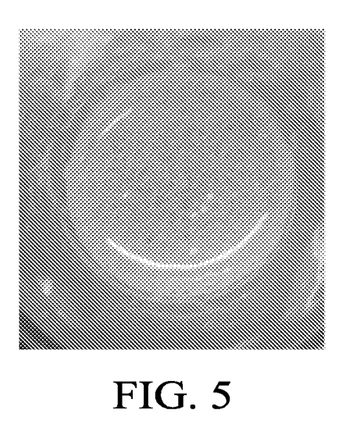
FIG. 5 is a photograph a treatment fluid as described herein.
Figure 6:
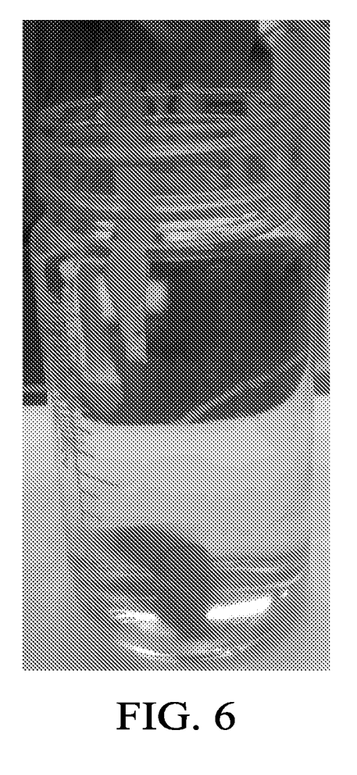
FIG. 6 is a photograph of a treatment fluid in the process of an injection into an aqueous fluid.
Figure 7:
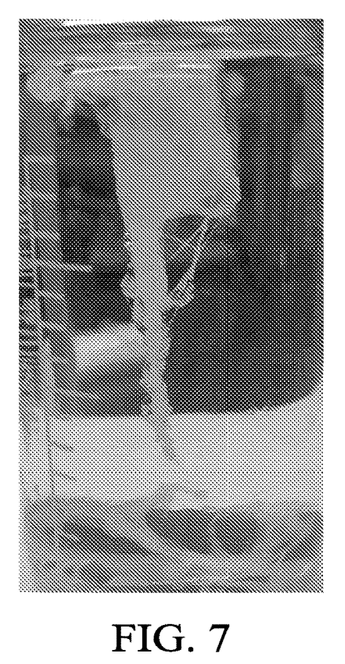
FIG. 7 is a photograph of the injected treatment fluid forming an amorphous polymeric web with the captured proppant.
Figure 8:
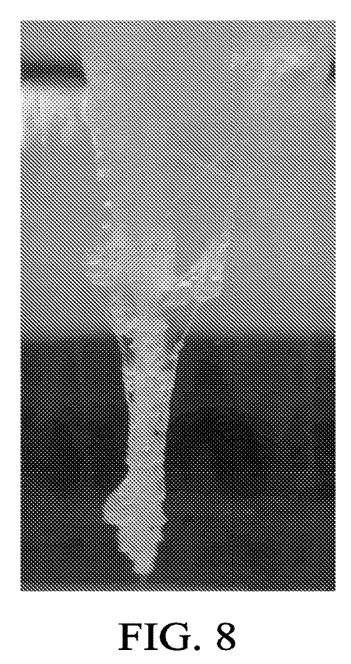
FIG. 8 is a photograph of an enlarged view of the amorphous polymeric web with the captured proppant.
Figure 9:
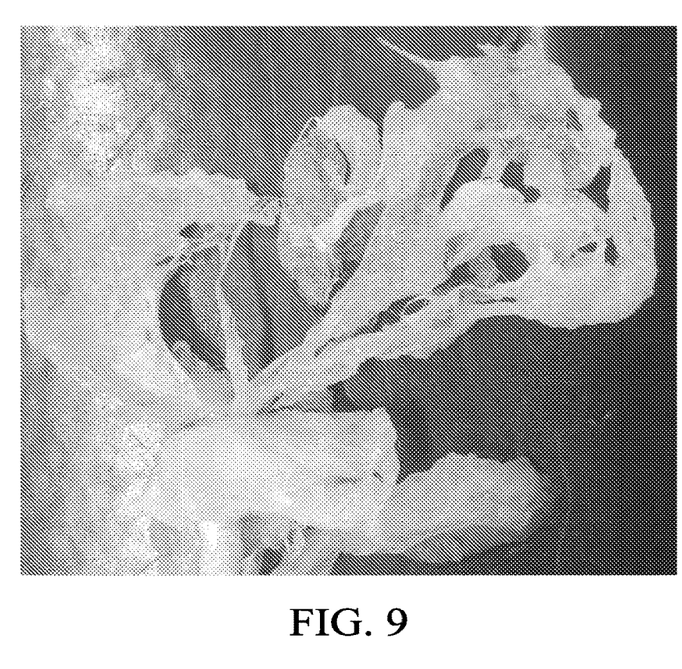
FIG. 9 is a photograph of the amorphous polymeric web with the captured proppant placed on a countertop.

One gram of polylactic acid, a polyester as described above, was added to ten milliliters of acetonitrile, a water-miscible solvent as described above, and mixed until a homogenous solution was formed, which is illustrated in the left vessel of FIG. 4. Five grams of coarse sand, a coarse-sized proppant as described above, was provided and illustrated by the right vessel of FIG. 4. The coarse sand was added to the solution at a 1% w/v concentration and mixed until the sand was suspended as desired as illustrated by FIG. 5 to form a treatment fluid. FIG. 6 illustrates the treatment fluid in process of being injected into an aqueous fluid with a pipette. FIG. 7 illustrates the injected treatment fluid forming an amorphous polymeric web with the captured sand. FIG. 7 also illustrates that there was no detectable amount of sand particles which were not captured by the amorphous polymeric web as there was no visible amount of sand which settled at the bottom of the vessel. FIG. 8 is an enlarged view of the amorphous polymeric web with the captured sand. FIG. 9 is a view of the amorphous polymeric web with the captured sand removed from the vessel and placed on a countertop. FIG. 9 illustrates the amorphous nature of the precipitated polyester and also how the proppant is captured and aggregated by the polyester as it is driven out of solution by contact with the aqueous fluid.

Provided are methods for propping a fracture in accordance with the description provided herein and as illustrated by FIGS. 1-9. An example method comprises providing a treatment fluid comprising a polyester, a water-miscible solvent, and a proppant; then pumping the treatment fluid through an aqueous fluid within a wellbore to form an amorphous polymeric web; then pumping the amorphous polymeric web into a fracture within a subterranean formation; and then allowing the amorphous polymeric web to dissolve. The polyester may be selected from the group consisting of poly(lactide), poly(glycolide), poly(e-caprolactone), poly(hydroxybutyrate), poly(orthoester), a copolymer thereof, a derivative thereof, and a combination thereof. The solvent may be selected from the group consisting of acetonitrile, dimethylformamide, methyl ethyl ketone, tetrhydrofuran, pyridine, N-methyl-2-pyrrolidone, dimethyl sulfoxide, butyrolactone, hexafluroro-2-propanol, acetic acid, formic acid, ethyl acetate, acetone, glycol, glycerol, tetrahydrofuran, dioxane, dichloromethane, methanol, acetonitrile, diethyl ether, benzene, toluene, trifluoroacetic acid, hexafluoro-2-propanol, dichloromethane, chloroform, carbon tetrachloride, pentane, hexane, heptane, octane, halogenated derivatives thereof, alkylated derivatives thereof, isomers thereof, or any mixture thereof. The proppant may comprise sand, natural sand, quartz sand, bauxite, ceramic materials, glass materials, particulate garnet, metal particulates, nylon pellets, polymer materials, polytetrafluoroethylene materials, nut shell pieces, seed shell pieces, fruit pit pieces, wood, silica, alumina, fumed carbon, carbon black, graphite, mica, titanium dioxide, meta-silicate, calcium silicate, kaolin, halloysite, nacrite, smectite, saponite, sepiolite montmorillonite, talc, zirconia, boron, slag, fly ash, hollow glass microspheres, solid glass, microparticulates, or combinations thereof. The concentration of the proppant in the treatment fluid may range from about 0.1% by weight of the treatment fluid to about 50% by weight of the treatment fluid. The proppant may have a particle size in a range of about 0.1 μm to about 100 μm. The proppant may have a particle size in a range of about 200 μm to about 5 mm. The treatment fluid may be foamed.

Provided are methods for propping a fracture in accordance with the description provided herein and as illustrated by FIGS. 1-9. An example method comprises providing a treatment fluid comprising a polyester, a water-miscible solvent, and a proppant; then mixing the treatment fluid with an aqueous fluid to form an amorphous polymeric web at the surface; then pumping the amorphous polymeric web into a wellbore; then pumping the amorphous polymeric web into a fracture within a subterranean formation; then allowing the amorphous polymeric web to dissolve. The polyester may be selected from the group consisting of poly(lactide), poly (glycolide), poly(e-caprolactone), poly(hydroxybutyrate), poly(orthoester), a copolymer thereof, a derivative thereof, and a combination thereof. The solvent may be selected from the group consisting of acetonitrile, acetic acid, formic acid, ethyl acetate, acetone, glycol, glycerol, tetrahydrofuran, dioxane, dichloromethane, methanol, and a combination thereof. The proppant may comprise sand, natural sand, quartz sand, bauxite, ceramic materials, glass materials, particulate garnet, metal particulates, nylon pellets, polymer materials, polytetrafluoroethylene materials, nut shell pieces, seed shell pieces, fruit pit pieces, wood, silica, alumina, fumed carbon, carbon black, graphite, mica, titanium dioxide, meta-silicate, calcium silicate, kaolin, halloysite, nacrite, smectite, saponite, sepiolite montmorillonite, talc, zirconia, boron, slag, fly ash, hollow glass microspheres, solid glass, microparticulates, or combinations thereof. The concentration of the proppant in the treatment fluid may range from about 0.1% by weight of the treatment fluid to about 50% by weight of the treatment fluid. The proppant may have a particle size in a range of about 0.1 μm to about 100 μm. The proppant may have a particle size in a range of about 200 μm to about 5 mm. The treatment fluid may be foamed.

Provided are systems for propping a fracture in accordance with the description provided herein and as illustrated by FIGS. 1-9. An example system comprises a treatment fluid comprising a polyester, a water-miscible solvent, and a proppant; a mixer capable of mixing the polyester, a water-miscible solvent, and a proppant; a tubular; an aqueous fluid positioned proximate to the tubular; and a pump capable of pumping the treatment fluid into the tubular and through the aqueous fluid. The polyester may be selected from the group consisting of poly(lactide), poly(glycolide), poly(e-caprolactone), poly(hydroxybutyrate), poly(orthoester), a copolymer thereof, a derivative thereof, and a combination thereof. The solvent may be selected from the group consisting of acetonitrile, acetic acid, formic acid, ethyl acetate, acetone, glycol, glycerol, tetrahydrofuran, dioxane, dichloromethane, methanol, and a combination thereof. The proppant may comprise sand, natural sand, quartz sand, bauxite, ceramic materials, glass materials, particulate garnet, metal particulates, nylon pellets, polymer materials, polytetrafluoroethylene materials, nut shell pieces, seed shell pieces, fruit pit pieces, wood, silica, alumina, fumed carbon, carbon black, graphite, mica, titanium dioxide, meta-silicate, calcium silicate, kaolin, halloysite, nacrite, smectite, saponite, sepiolite montmorillonite, talc, zirconia, boron, slag, fly ash, hollow glass microspheres, solid glass, microparticulates, or combinations thereof. The concentration of the proppant in the treatment fluid may range from about 0.1% by weight of the treatment fluid to about 50% by weight of the treatment fluid. The proppant may have a particle size in a range of about 0.1 μm to about 100 μm. The proppant may have a particle size in a range of about 200 μm to about 5 mm. The treatment fluid may be foamed.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of propping a fracture, the method comprising:

providing a treatment fluid comprising a polyester, a water-miscible solvent, and a proppant;

then pumping the treatment fluid through an aqueous fluid within a wellbore to form an amorphous polymeric web;

then pumping the amorphous polymeric web and the proppant into the fracture within a subterranean formation; and then allowing the amorphous polymeric web to dissolve.

2. The method of claim 1, wherein the polyester is selected from the group consisting of poly(lactide), poly(glycolide), poly(e-caprolactone), poly(hydroxybutyrate), poly(orthoester), a copolymer thereof, a derivative thereof, and a combination thereof.

3. The method of claim 1, wherein the water-miscible solvent is selected from the group consisting of acetonitrile, dimethylformamide, methyl ethyl ketone, tetrhydrofuran, pyridine, N-methyl-2-pyrrolidone, dimethyl sulfoxide, butyrolactone, hexafluroro-2-propanol, acetic acid, formic acid, ethyl acetate, acetone, glycol, glycerol, tetrahydrofuran, dioxane, dichloromethane, methanol, acetonitrile, diethyl ether, benzene, toluene, trifluoroacetic acid, hexafluoro-2-propanol, dichloromethane, chloroform, carbon tetrachloride, pentane, hexane, heptane, octane, halogenated derivatives thereof, alkylated derivatives thereof, isomers thereof, or any mixture thereof.

4. The method of claim 1, wherein the proppant comprises sand, natural sand, quartz sand, bauxite, ceramic materials, glass materials, particulate garnet, metal particulates, nylon pellets, polymer materials, polytetrafluoroethylene materials, nut shell pieces, seed shell pieces, fruit pit pieces, wood, silica, alumina, fumed carbon, carbon black, graphite, mica, titanium dioxide, meta-silicate, calcium silicate, kaolin, halloysite, nacrite, smectite, saponite, sepiolite montmorillonite, talc, zirconia, boron, slag, fly ash, hollow glass microspheres, solid glass, microparticulates, or combinations thereof.

5. The method of claim 1, wherein the concentration of the proppant in the treatment fluid ranges from about 0.1% by weight of the treatment fluid to about 50% by weight of the treatment fluid.

6. The method of claim 1, wherein the proppant has a particle size in a range of about 0.1 µm to about 100 µm.

7. The method of claim 1, wherein the proppant has a particle size in a range of about 200 µm to about 5 mm.

8. The method of claim 1, wherein the treatment fluid is foamed.

9. A method of propping a fracture, the method comprising:

providing a treatment fluid comprising a polyester, a water-miscible solvent, and a proppant;

then mixing the treatment fluid with an aqueous fluid to form an amorphous polymeric web at the surface;

then pumping the amorphous polymeric web and the proppant into a wellbore;

then pumping the amorphous polymeric web and the proppant into the fracture within a subterranean formation;

then allowing the amorphous polymeric web to dissolve.

10. The method of claim 9, wherein the polyester is selected from the group consisting of poly(lactide), poly(glycolide), poly(e-caprolactone), poly(hydroxybutyrate), poly(orthoester), a copolymer thereof, a derivative thereof, and a combination thereof.

11. The method of claim 9, wherein the water-miscible solvent is selected from the group consisting of acetonitrile, acetic acid, formic acid, ethyl acetate, acetone, glycol, glycerol, tetrahydrofuran, dioxane, dichloromethane, methanol, and a combination thereof.

12. The method of claim 9, wherein the proppant comprises sand, natural sand, quartz sand, bauxite, ceramic materials, glass materials, particulate garnet, metal particulates, nylon pellets, polymer materials, polytetrafluoroethylene materials, nut shell pieces, seed shell pieces, fruit pit pieces, wood, silica, alumina, fumed carbon, carbon black, graphite, mica, titanium dioxide, meta-silicate, calcium silicate, kaolin, halloysite, nacrite, smectite, saponite, sepiolite montmorillonite, talc, zirconia, boron, slag, fly ash, hollow glass microspheres, solid glass, microparticulates, or combinations thereof.

13. The method of claim 9, wherein the concentration of the proppant in the treatment fluid ranges from about 0.1% by weight of the treatment fluid to about 50% by weight of the treatment fluid.

14. The method of claim 9, wherein the proppant has a particle size in a range of about 0.1 µm to about 100 µm.

15. The method of claim 9, wherein the proppant has a particle size in a range of about 200 µm to about 5 mm.

16. The method of claim 9, wherein the treatment fluid is foamed.

17. A system for propping a fracture, the system comprising:

a treatment fluid comprising an amorphous polymeric web, a water-miscible solvent, and a proppant;

a tubular; and a pump capable of pumping the treatment fluid through the tubular and into the fracture.

18. The system of claim 17, wherein the amorphous polymeric web is formed from a polyester selected from the group consisting of poly(lactide), poly(glycolide), poly(e-caprolactone), poly(hydroxybutyrate), poly(orthoester), a copolymer thereof, a derivative thereof, and a combination thereof.

19. The system of claim 17, wherein the water-miscible solvent is selected from the group consisting of acetonitrile, acetic acid, formic acid, ethyl acetate, acetone, glycol, glycerol, tetrahydrofuran, dioxane, dichloromethane, methanol, and a combination thereof.

20. The system of claim 17, wherein the concentration of the proppant in the treatment fluid ranges from about 0.1% by weight of the treatment fluid to about 50% by weight of the treatment fluid.

* * * * *